United States Patent

[11] 3,610,705

[72] Inventor Paul E. Titus
 Houston, Tex.
[21] Appl. No. 827,584
[22] Filed May 26, 1969
[45] Patented Oct. 5, 1971
[73] Assignee Shell Oil Company
 New York, N.Y.

[54] METHOD OF LIMITING THE LOGITUDINAL SETTLING OF SOLIDS IN INCLINED SLURRY PIPELINES
1 Claim, 6 Drawing Figs.
[52] U.S. Cl. ................................................ 302/64,
 302/14
[51] Int. Cl. .................................................. B65g 53/34

[50] Field of Search ............................................ 302/14, 64, 66

[56] References Cited
FOREIGN PATENTS
1,016,191 9/1957 Germany ...................... 302/64

Primary Examiner—Andres H. Nielsen
Attorneys—Thomas R. Lampe and J. H. McCarthy

ABSTRACT: A method of laying a pipeline along sloped terrain to prevent downhill slumping in a shutdown slurry pipeline wherein the path of the pipeline is deviated from its normal prescribed course, into a predetermined geometric pattern and then returned to the normal path.

PATENTED OCT 5 1971
3,610,705
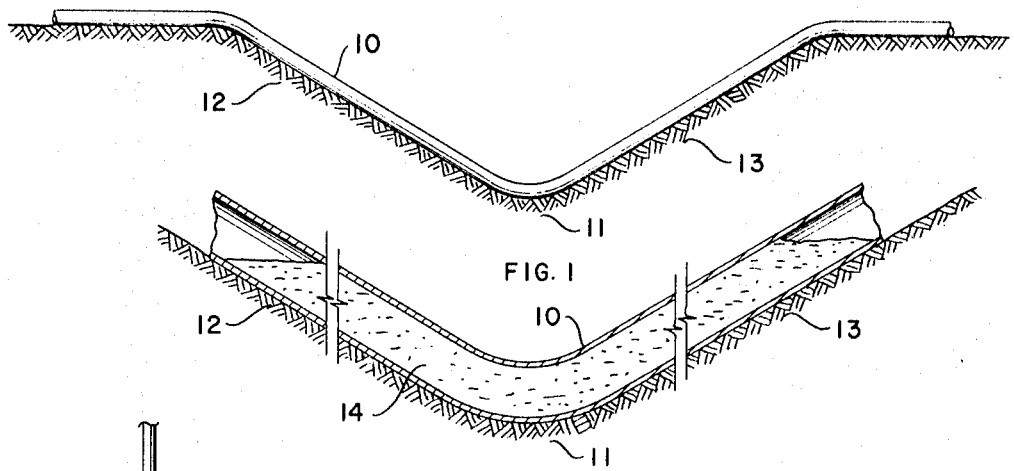
FIG. 1
FIG. 2
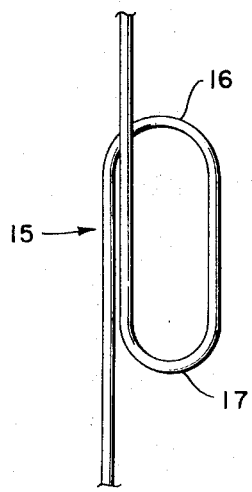
FIG. 3
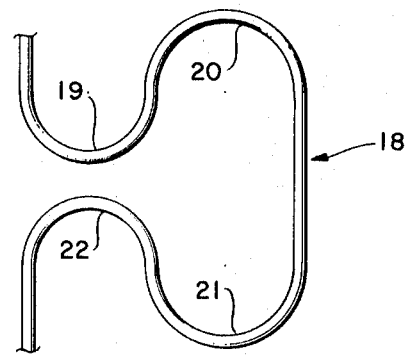
FIG. 4
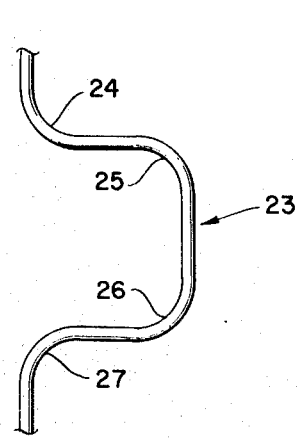
FIG. 5
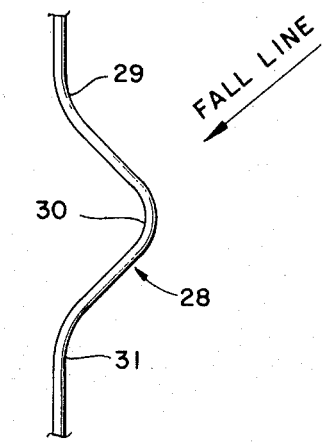
FIG. 6
INVENTOR:
P. E. TITUS

METHOD OF LIMITING THE LOGITUDINAL SETTLING OF SOLIDS IN INCLINED SLURRY PIPELINES

BACKGROUND OF THE INVENTION

1. Field of the Invention

The present invention relates to pipeline transport operations, and, more particularly, to a method for preventing the downward movement of slurry solids in an inclined portion of pipeline during a shutdown period.

2. Description of the Prior Art

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products.

The transportation of slurries consisting of solid particles suspended in a fluid medium by use of pipelines is quite well known, and such expedient is finding increasing use, especially in those situations where the source of raw material to be shipped is relatively remote and inaccessible. One such application is the transportation of sulfur from remote regions, e.g., in Canada, to more populous, industrial areas. The sulfur is ground into particle size and mixed in suspension with a suitable fluid which in turn is pumped through a pipeline.

As long as flow continues in the pipeline the solids particles in the slurry will generally remain in suspension in the fluid, even when the solid matter has a higher specific gravity than the liquid. However, if the flow is stopped for any reason, e.g., the pipeline is shut down, such solid matter will settle out of suspension. In the situation where the line is horizontal or the slope of the line is insufficient to cause sliding of the settled solids, no problem is created by such settling out. Under these conditions, a liquid-rich channel remains open at the top of the line which allows the settled solids to be resuspended with a minimum of difficulty upon resumption of flow in the pipeline.

However, with respect to the pipeline transportation of materials in slurry form, problems arise when such materials are moved through pipelines inclined to go over a hill or down into a valley. At these locations, during a planned or emergency line shutdown, the solids in the transported slurry may settle out vertically and, subsequently, slide down the inclined portion of the pipeline, thereby causing a compacted plug which may be very difficult to dislodge and move when line shutdown is terminated and transport activities are resumed.

These difficulties are most commonly avoided by laying solids-carrying or slurry pipelines so they do not exceed a slope or angle of inclination below which sliding does not occur. Alternatively, the inclined pipeline sections are emptied at each shutdown. Obviously, these alternative prior art approaches are not always feasible or economical, especially in those situations where long and relatively steep slopes are encountered. Slopes of this nature are being encountered with increasing frequency as pipeline operations are being extended to new, relatively inaccessible mountainous areas in the United States and elsewhere.

SUMMARY OF THE INVENTION

It is, therefore, a primary object of the present invention to provide an improved and economical method whereby slurry material being transported in an inclined pipeline section is prevented from slumping during a line shutdown.

It is a further object of this invention to lay a slurry pipeline on an inclined section in a particular geometric pattern so as to divide the sloped line into increments of length sufficiently short to prevent the slumped solids from gravitationally compacting in the valley portions of the pipeline.

These and other objects have been attained in the present invention by providing a method of laying a pipeline along sloped terrain to prevent downhill slumping in a shutdown slurry pipeline wherein the path of the pipeline is deviated from its normal prescribed course into a predetermined geometric pattern and then returned to the normal path where the laying operation continues. This arrangement divides the sloped portion of the pipeline into shorter increments of length to prevent the slumped solids from gravitationally compacting into a mass difficult or impossible to put into motion after a line shutdown.

DESCRIPTION OF THE DRAWINGS

FIG. 1 is a sectional elevation of typical terrain to which the subject invention is applicable;

FIG. 2 is a partial section of a slurry pipeline at a low point or valley showing a compacted plug of solids;

FIG. 3 is a plan view of a pipeline laid along an inclined section of terrain and illustrating one embodiment of the subject invention;

FIG. 4 is a plan view of a similar pipeline illustrating another embodiment of the invention;

FIG. 5 is a plan view of a pipeline illustrating a further embodiment of the invention; and FIG. 6 is a plan view of a pipeline illustrating a still further embodiment of the invention.

DESCRIPTION OF THE PREFERRED EMBODIMENT

Referring now to FIG. 1, typical terrain for illustrating the subject invention is shown in which a pipeline 10 for transporting slurries is laid along terrain including a valley portion 11 and slopes or inclined portions 12 and 13.

The terrain illustrated is typical of that encountered in pipeline laying operations, although it should be understood that the teachings of the present invention may be carried out on any topography wherein a portion of slurry pipeline is inclined. The arrangement is such that if the pipeline is shut down for any appreciable amount of time for repairs or other reasons, solids suspended in the slurry carried in the pipeline 10 will gravitationally move or "slump" down the portions of the pipeline adjacent to the inclines 12 and 13 and settle in the portion of the pipeline adjacent to valley 11. The solid material would then compress under its own weight to form a plug in the valley.

The resulting condition is shown in detail in FIG. 2 which illustrates a cross section of the pipeline 10 in the vicinity of the valley 11. As illustrated in FIG. 2, the pipeline 10 is filled with a plug of compacted solids 14 which have collected in the low point of the pipeline. As more and more solids settle into the low point of pipeline 10, the plug 14 becomes more compacted and may become so dense that on restarting of the pipeline it is impossible for the plug to be moved and flow reestablished in the pipeline.

Such plug formation is prevented or minimized in accordance with the teachings of the present invention as follows. Assuming the normal direction of flow in the pipeline 10 is from left to right as viewed in FIG. 1, the inclined portion of the pipeline lying along incline 12 will be designated as the downhill portion and the inclined portion lying along incline 13 will be designated as the uphill portion. This designation will be helpful in understanding the following description of the invention although it is to be understood that the designation is for illustrative purposes only and flow in the pipeline may be reversed in actual practice.

The present invention is concerned with laying the pipeline 10 along the inclines 12 and 13 in a particular configuration which deviates from the nominal path of the pipeline. For example, the pipeline may have a predetermined nominal path which follows the "fall line" of the inclines 12 and 13.

As used herein, the term "fall line" is intended to mean the natural downward course along a slope or hillside such as would be followed by a freely rolling ball released at the top of the hill, assuming there are not obstructions on the hill to deflect its path. Stated another way, the fall line could be the most direct route down a hillside.

In accordance with the invention, pipeline 10 is laid so that at least one portion of the downhill and uphill legs deviate at least 90° from the fall line. Referring now to FIG. 3, a plan view of a portion of a pipeline 15 laid in accordance with the invention is disclosed. As shown, the pipeline portion 15 would make up a part of pipeline 10 shown in FIG. 1 and may be disposed in either the downhill or uphill leg of pipeline 10 to prevent slumping of slurries as will be hereinafter described.

The pipeline portion 15 is laid so that it deviates from the normal path of the pipeline and passes through two 180° bends 16 and 17 so that a complete loop in the pipeline is formed. To a slurry flowing through the pipeline, the loop presents itself as a "trap" so that during line shutdown, solids in the slurry above the loop will only settle longitudinally into bend 16 or 17 (depending on the direction of flow) rather than settling all the way into the valley 11 shown in FIG. 1. Only the solids in the slurry below the loop would settle into valley 11. In the case of a particularly long or steep section, several loops can be formed in the pipeline at spaced intervals. Thus, fewer solids will settle at each 180° bend and in the valley so that no highly compacted plugs are formed which would impede flow restarting the pipeline.

The pipeline may also be laid in other configurations in accordance with the invention. One further embodiment is shown in FIG. 4 in which a pipeline portion 18 is laid with four successive 180° bends 19, 20, 21 and 22. Each of these bends presents itself a trap or block to solids settling during line shutdown. In the event the flow is from top to bottom as shown in FIG. 4, solids would settle in bends 19 and 21. If the flow is reversed, the settling would take place in bends 22 and 20. Again, as in the FIG. 3 embodiment, a pipeline may be deviated from its normal path as shown in FIG. 4, a number of times at spaced intervals along a sloped section to effectively divide the sloped line into increments of length sufficiently short to prevent the slumped solids from gravitationally compacting into a mass difficult or impossible to put into motion after a line shutdown.

Still another embodiment illustration of the invention is shown in FIG. 5. In this embodiment, a pipeline portion 23 is laid so that it passes through four successive 90° bends 24, 25, 26 and 27. This configuration will tend to slow solids settling in a pipeline and also serve to trap some solids in the lateral portions between bends 24–25 and between 26–27.

In some cases the nominal path of a pipeline does not always follow the fall line of a hill, e.g., when the topography requires laying a pipeline diagonally down a hill. In such a case, it may not be necessary to deviate a pipeline 90° or more from its normal path as shown in FIGS. 3, 4 and 5, but rather just sufficiently to assure that it deviates 90° from the fall line of the hill. This arrangement is disclosed in FIG. 6, in which a pipeline portion 28 has a nominal path oblique to the fall line. The pipeline is deflected during laying at point 29 so that it is at least 90° to the fall line. Thereafter, it passes through bends 30 and 31 to return to its normal course. The resultant "jog" in the pipeline serves as a trap in the same manner as the configuration discussed above with reference to FIGS. 3, 4 and 5 to prevent or minimize solids slumping.

Although several embodiments of the invention have been disclosed, it is contemplated that other configurations may be employed by one skilled in the art without departing from the spirit of the invention. Whatever particular geometric pattern is employed, the pipeline should be laid to change direction in such a manner as to cause a block to the settling solids (by wall and interparticle friction), but at the same time to keep pressure drop to a minimum at flowing conditions. The best geometrical design and size, and number of the settling-solids blocks would be determined by a number of factors, such as geography, pipe size, slurry concentration, particle density, size and shape and liquid properties.

I claim as my invention;

1. A method of minimizing the downward movement of solids in an inclined portion of a pipeline adapted to transport solids as slurries, said method comprising:
   determining a path for a pipeline across terrain wherein said terrain has at least one valley and sloped portions on each side of said valley and said path follows substantially the contour of said terrain;
   laying said pipeline substantially along said path to a point on one of said sloped portions;
   deviating the course of said pipeline from said path in a direction away from said path in a plane substantially parallel to the surface of said terrain;
   returning the course of said pipeline back to said path so as to form a complete 360° loop in said pipeline; and
   laying said pipeline along the remainder of said path.